United States Patent [19]

Facaros

[11] Patent Number: 5,098,619

[45] Date of Patent: Mar. 24, 1992

[54] PROCESS FOR FORMING HIGH QUALITY FERRITE MAGNETS

[75] Inventor: George Facaros, Alma, Mich.

[73] Assignee: Hitachi Metals International, Ltd., Purchase, N.Y.

[21] Appl. No.: 415,612

[22] Filed: Oct. 2, 1989

[51] Int. Cl.$^5$ .................................. B06B 1/02
[52] U.S. Cl. ........................... 264/24; 148/101; 148/103; 264/66; 264/DIG. 58
[58] Field of Search ............ 264/22, 24, 56, 109, 264/118, DIG. 58, 66; 252/62.56, 62.63; 148/300, 306, 100, 101, 103, 105, 108

[56] References Cited

U.S. PATENT DOCUMENTS 3,849,213 11/1974 Baermann ..................... 148/108
4,062,922 12/1977 Olson et al. .................... 264/294

*Primary Examiner*—James Lowe
*Assistant Examiner*—Christopher A. Fiorilla
*Attorney, Agent, or Firm*—Gifford, Groh, Sprinkle, Patmore and Anderson

[57] ABSTRACT

An improved process for forming high quality ferrite magnets utilizes relatively coarsely ground magnetic materials. The process includes pre-milling a blended and calcined magnetic material to about 0.7-1.2 microns, pressing the blend into a preform shape in the presence of an orienting magnetic field, granulating the preformed material, pre-sintering the granules short of complete sintering, milling the granules to a coarse size of about 1-2 microns, forming the milled blend into desired forms in the presence of an orienting magnetic field, sintering the pressed material, and optionally machining the sintered material.

13 Claims, No Drawings

PROCESS FOR FORMING HIGH QUALITY FERRITE MAGNETS

BACKGROUND OF THE INVENTION

I. Field of the Invention

This invention relates to an improved process for manufacturing magnets and, in particular, to a process for manufacturing ferrite magnets using coarse materials.

II. Description of the Prior Art

Typically, permanent ferrite magnets of the type $MO \cdot 6Fe_2O_3$ (M is typically barium, strontium or lead) are manufactured by dispersing magnetic particles in a supporting matrix and subjecting the magnetic particles to an orienting magnetic field which applies a torque to the magnetic particles causing their domains to align.

Magnetic particles consist of domains in which the electrons in the outermost shell have uncompensated spins along a common axis. In a given domain the electron spins are all aligned in one direction. In a given magnetic particle, multiple domains tend to arrange themselves so that the uncompensated spins from one domain cancel those from another domain, leaving the particle in a minimum energy state and without magnetic properties. As particle size is reduced, the number of domains possible is also reduced, thus leaving the given particle with a net uncompensated spin and magnetic properties.

Exposing magnetic particles to an orienting magnetic field causes the particles to assume a specific alignment with respect to the orienting field. Accordingly, permanent magnets have previously been formed by milling magnetic materials to a very fine particle size in order to maximize the net effect of uncompensated spins, forming the particles into a generally desired shape while subjecting them to an orienting magnetic field, heating the mixture to sinter the particles, and thereafter grinding the sintered magnet to its desired final proportions.

More specifically, the standard process as previously known comprises blending the raw materials with additives and calcining the mixture. This is followed by dry and/or wet milling to a very fine particle size of about 0.7 to 1.2 microns. This mixture is then placed in a form, subjected to an orienting field, and sintered at a temperature below the melting point until a single unified structure is formed. The magnet so formed is then cooled and machined to its final dimensions.

The many disadvantages of the standard process described above are known to those in the art. For example, with certain forming processes, such as dry pressing, extruding, and isostatic forming, the strength of the orienting field must be so great that it is difficult to fully orient the particles formed by these processes. Since the torque exerted by the orienting field increases as the cube of the particle diameter, finely ground particles require much larger orienting fields than coarsely ground particles.

SUMMARY OF THE PRESENT INVENTION

These and other disadvantages are overcome by the present invention which comprises an improved process for manufacturing magnets. The improved process enables the use of coarser magnetic particles than the standard process. The initial steps are similar to those of the standard process and comprise blending the raw materials with additives and calcining the mixture.

According to the improved process of the present invention, the calcined mixture is then pre-milled to its ultimate particle size of about 0.7 to 1.2 microns. The material is then subjected to an orienting magnetic field and is pressed into preformed shapes. At this point large presses and simple tooling may be employed as pressing defects are not critical.

The preformed or pressed pieces are then granulated to some convenient small size and the granules are then heated, but at a temperature lower than that normally used for sintering. This heating step is called pre-sintering, and is designed to interrupt the sintering process to maximize densification and magnetic properties.

After pre-sintering, the mixture is dry milled and then wet milled to a particle size of about 1.0 to 1.5 microns. These particles are then preformed into their desired shapes within an orienting field and heated or sintered again, this time under normal sintering conditions. Finally, the resulting magnets are machined, if necessary, to their final desired dimensions.

DETAILED DESCRIPTION OF THE PREFERRED EMBODIMENTS

This invention comprises an improved process for manufacturing magnets, which process enables the use of coarser particles than the standard process. The initial steps are similar to those of the standard process and will not be described in great detail as they are known to those of ordinary skill in the art. Initially, the raw materials are blended with additives generally known to those skilled in the art, and the blend is calcined. Calcining is a solid state reaction which removes volatile materials and forms the remaining materials into permanent magnet material of hexagonal crystalline structure and of composition $MO \cdot 6Fe_2O_3$ ( is preferably barium, strontium or lead).

According to the improved process, the calcined mixture is then pre-milled to its ultimate particle size, selected to optimize the magnetic properties of the resulting permanent magnet. Preferably, the pre-milling comprises two steps: dry milling to about 25 microns and wet milling with conventional additives to about 0.7 to 1.2 microns.

The material is then subjected to an orienting magnetic field and is pressed into preformed shapes. Large presses and simple tooling may be employed at this step since pressing defects are not critical. Magnetic properties are improved by pressing thinner compacts, preferably, for example, less than one inch thick.

The preformed or pressed pieces are then granulated to some convenient small size, such as ¼ inch granules. The granules are then pre-sintered for a first time period at a temperature lower than that normally used for sintering. Preferably, the granules are heated for about 30 minutes at a temperature between 1050° C. and 1200° C. The purpose of this pre-sintering step is to interrupt the sintering process and thereby maximize the densification and magnetic properties of the resulting magnets.

After pre-sintering, the mixture is milled a second time to reduce particle size. Preferably, the mixture is first dry milled to approximately 25 microns, and then wet milled to a particle size of about 1.0 to 1.5 microns.

These particles are then fabricated or pressed in the presence of an orienting magnetic field into their ultimate shapes and sintered for a second time period at their normal sintering temperature. Typically, the particles are sintered at about 1200° C. to about 1250° C. for about 30 minutes.

Upon cooling, the resulting sintered magnets may be machined, if necessary, to their desired dimensions.

The following two examples serve to illustrate the process of the present invention:

EXAMPLE A

A calcined production mixture of additives (0.2 percent by weight $SiO_2$ and 0.5 percent by weight $CaCO_3$) and $SrO\cdot6Fe_2O_3$ magnetic particles pre-milled to a particle size of 1.15 microns was pressed into the shape and size of standard No. 9 speaker magnets. The magnets were granulated to ¼ inch mesh and pre-sintered at 1100° C. for one-half hour. A No. 9 magnet was similarly treated as a control and experienced a 4% shrinkage in a direction perpendicular to the pressing direction. This is about one-third of normal shrinkage. The pre-sintered granules were then first dry and then wet milled to 1.50, 1.30 and 1.15 microns and were pressed into three respective test pieces. The test pieces and the No. 9 magnet were then sintered at the standard production sintering conditions of 1249° C. The No. 9 magnet and the test pieces exhibited magnetic properties according to Table A.

TABLE A

| Sample | Particle Size (microns) | $B_r$ (gauss) | $H_c$ (oersteds) | $H_{ci}$ (oersteds) | $BH_{max}$ (megagauss-oersteds) |
|---|---|---|---|---|---|
| No. 9 Magnet | 1.15 | 4000 | 2510 | 2650 | 3.70 |
| $TP_1$ | 1.50 | 4100 | 2550 | 2610 | 4.00 |
| $TP_2$ | 1.30 | 4150 | 2570 | 2650 | 4.06 |
| $TP_3$ | 1.15 | 4200 | 2615 | 2700 | 4.20 |

EXAMPLE B

A calcined production mixture of additives and magnetic materials like the mixture of Example A were pre-milled to 0.90 microns and pressed into control test pieces. Some of the pieces were processed according to the standard process as controls. Others of the test pieces were granulated and pre-sintered at 1172° C. These other test pieces were then milled into particle sizes ranging from 0.99 microns to 1.76 microns and were pressed into respective experimental test pieces. The experimental test pieces were then sintered at 1231° C. The test pieces from example B exhibited magnetic properties according to Table B.

TABLE B

| Sample | Particle Size (microns) | $B_r$ (gauss) | $H_c$ (oersteds) | $H_{ci}$ (oersteds) | $BH_{max}$ (megagauss-oersteds) |
|---|---|---|---|---|---|
| TP control | 0.90 | 3800 | 3520 | 3940 | 3.4 |
| $TP_1$ | 1.76 | 3420 | 3200 | 4100 | 3.0 |
| $TP_2$ | 1.36 | 3600 | 3365 | 4080 | 3.15 |
| $TP_3$ | 1.28 | 3660 | 3425 | 4100 | 3.23 |
| $TP_4$ | 1.13 | 3730 | 3460 | 4100 | 3.32 |
| $TP_5$ | 1.05 | 3800 | 3560 | 4080 | 3.4 |
| $TP_6$ | 0.99 | 3825 | 3600 | 4140 | 3.43 |

In the Examples and Tables, B represents flux density and $B_r$ is the remanence, or flux density remaining once the orienting field is removed. Higher $B_r$ values indicate stronger permanent magnets. The orienting field strength is represented by H, and $H_c$ is the coercive force or field strength required to reverse the direction of the flux. $H_{ci}$ is the intrinsic coercive force. $BH_{max}$ is the total hysteresis area or energy product, and is the most useful measurement of the magnetic properties of permanent magnets.

It can be seen from the magnetic properties displayed in tables A and B that magnets formed by the improved process from particle sizes of about 1.10 microns have magnetic properties comparable with magnets formed by the standard process from particles of about 0.90 microns. Thus, coarser particles than conventional may be used during the forming and orienting steps of the improved process while still obtaining the magnetic properties yielded by more finely ground particles.

Advantages of the manufacturing process of the present invention abound. Although the additional steps involved will increase the cost of material preparation somewhat, the benefits will outweigh the additional costs. Certain steps will proceed more quickly or more cheaply with coarse particles than with finer particles. For example, wet pressing may be faster by a factor of two, and settling of the particles after fine milling proceeds more quickly with coarse materials. Net yield is expected to be higher because the use of coarse particles results in less pressing defects and distortion. Difficult parts, such as arc segments of large angular extent, relatively thick parts, and the like, can be more easily pressed from the higher grades of magnetic material. Coarser particles allow filter cloth material to be used longer. Formed parts can be ground both easier and faster, lowering grinder downtime from chips and broken parts. In-process inventory is reduced because the coarser material settles faster. Moreover, there are several forming processes which have not been previously employed because it was impossible to develop the high orienting fields needed to obtain acceptable magnetic properties. Such processes include dry pressing, extruding, isostatic forming, and the forming of oriented flexible magnets. As previously mentioned, however, the torque exerted by the orienting magnetic field increases as the cube of the particle diameter. Therefore, weaker orienting magnetic fields need be applied when coarser particles are being used. The use of coarser particles allows these other processes to be employed.

The foregoing detailed description of the preferred embodiment has been given for clearness of understanding only and no unnecessary limitations should be understood therefrom. Many modifications will be obvious to those skilled in the art to which the invention pertains without deviation from the spirit of the invention as defined by the scope of the appended claims.

I claim:

1. An improved process for forming high quality magnets comprising the steps of:
    a) pre-milling a ferrite magnetic material according to the substeps of:
        (1) dry milling said material to a particle size of about 25 microns; and
        (2) wet milling said dry milled particles to a particle size of about 0.7 to 1.2 microns;
    b) pressing said material into a preform shape in the presence of an orienting magnetic field;
    c) granulating said preformed material to a convenient small size;
    d) heating the resultant granules to a first temperature less than that required for final sintering;
    e) milling said granules to a particle size of about 0.9 to 2.0 microns;
    f) molding said milled material in the presence of an orienting magnetic field into a desired form; and g) sintering said pressed material at a second temperature higher than said first temperature adequate to establish good magnetic properties in said material.

2. The process defined in claim 1 and comprising the additional steps of blending at least one additive with said magnetic material and calcining the resulting blend prior to said pre-milling step.

3. The process defined in claim 1 wherein said first temperature is about 1050° C. to 1200° C.

4. The process defined in claim 3 wherein said first temperature is about 1100° C. to 1200° C.

5. The process defined in claim 1 wherein said milling step comprises dry milling said granules to a particle size of about 25 microns, followed by wet milling to a particle size of about 0.9 to 1.5 microns.

6. The process defined in claim 1 wherein said second temperature is about 1200° C. to 1250° C.

7. The process defined in claim 1, further comprising machining said sintered material to finished dimensions.

8. The process defined in claim 1 wherein said ferrite material is $MO \cdot 6Fe_2O_3$, M being a divalent metal.

9. The process defined in claim 8, wherein M is barium, strontium, or lead.

10. The process defined in claim 2 wherein said at least one additive is $SiO_2$ or $CaCO_3$.

11. The process defined in claim 2 wherein said material comprises 0.2 percent by weight $SiO_2$, 0.5 percent by weight $CaCO_3$, and the remainder being $SrO \cdot 6Fe_2O_3$.

12. An improved process for forming high quality magnets comprising the steps of:
   a) pre-milling a ferrite magnetic material according to the substeps of:
      (1) dry milling said material to a particle size of about 25 microns; and
      (2) wet milling said particles to a particle size of about 0.7 to 1.2 microns;
   b) pressing said material into a preform shape in the presence of an orienting magnetic field;
   c) granulating said preformed material to a convenient small size;
   d) heating the resultant granules to a first temperature of about 1050° C. to 1200° C.;
   e) milling said granules to a particle size of about 0.9 to 2.0 microns;
   f) molding said milled material in the presence of an orienting magnetic field into a desired form; and
   g) sintering said pressed material at a temperature of about 1200° C. to 1250° C.

13. An improved process for forming high quality magnets comprising the steps of:
   a) pre-milling a ferrite magnetic material according to the substeps of:
      (1) dry milling said material to a particle size of about 25 microns; and
      (2) wet milling said particle to a particle size of about 0.7 to 1.2 microns;
   (b) pressing said material into a preform shape in the presence of an orienting magnetic field;
   c) granulating said preformed material to a convenient small size;
   d) heating the resultant granules to a first temperature less than that required for final sintering;
   e) milling said granules according to the substeps of:
      (1) dry milling said granules to a particle size of about 25 microns; and
      (2) wet milling said granules to a particle size of about 0.9 to 2.0 microns;
   f) molding said milled material in the presence of an orienting magnetic field into a desired form; and
   g) sintering said pressed material at a second temperature higher than said first temperature adequate to establish good magnetic properties in said material.

* * * * *